United States Patent [19]
Roth

[11] Patent Number: 5,511,366
[45] Date of Patent: Apr. 30, 1996

[54] WATER BODY CLEANING APPARATUS AND METHOD

[76] Inventor: George L. Roth, 1501 Atlantis Dr., Apopka, Fla. 32703

[21] Appl. No.: 392,255

[22] Filed: Feb. 22, 1995

[51] Int. Cl.⁶ .................................................. A01D 44/00
[52] U.S. Cl. ........................................ 56/8; 37/340
[58] Field of Search ........................... 56/8, 9, 1; 37/340, 37/341, 342, 345

[56] References Cited

U.S. PATENT DOCUMENTS

| | | |
|---|---|---|
| 2,050,133 | 8/1936 | Smith ............................................. 56/8 |
| 2,648,940 | 8/1953 | Merkley et al. ............................... 56/8 |
| 2,737,769 | 3/1956 | Donald ........................................ 56/27 |
| 3,751,887 | 8/1973 | den Herder et al. .......................... 56/8 |
| 4,070,978 | 1/1978 | Virgilio ...................................... 114/26 |
| 4,137,693 | 2/1979 | Thompson et al. ............................ 56/8 |
| 4,328,658 | 5/1982 | Desrosiers et al. ............................ 56/8 |
| 4,616,588 | 10/1986 | Caddick ................................... 114/162 |
| 4,696,149 | 9/1987 | Hawk ............................................ 56/8 |
| 4,768,331 | 9/1988 | Jones ............................................ 56/8 |
| 4,818,390 | 4/1989 | Manchak, Jr. ......................... 37/342 X |
| 5,074,105 | 12/1991 | Roth ............................................. 56/8 |

*Primary Examiner*—Terry Lee Melius
*Attorney, Agent, or Firm*—Edward M. Livingston

[57] ABSTRACT

A lake rake (1) or other aquatic tool that is drag-line operated in a body of water (4) between a first earth-anchored vehicle (9) with a motorized winch (8) at a distal position (15) and a second earth-anchored vehicle (11) with a motorized winch (10) and a loading means (12, 13) at a proximal shore (16) of the body of water. The lake rake or other aquatic tool is pulled with a positioning line (5) by the winch on the first earth-anchored vehicle against selective braking resistance of a drag line (6) operated by the winch on the second earth-anchored vehicle to position the lake rake or other aquatic tool in a raised position relative to the body of water at a desired position proximate the first earth-anchored vehicle. There the lake rake or other aquatic tool is dropped to a bottom (17) of the body of water by release of tension between the two winches. The lake rake or other aquatic tool is then winched to the proximal shore of the body of water and aquatic plants (7) gathered thereby are removed to a desired site (20) by the second earth-anchored vehicle.

14 Claims, 3 Drawing Sheets

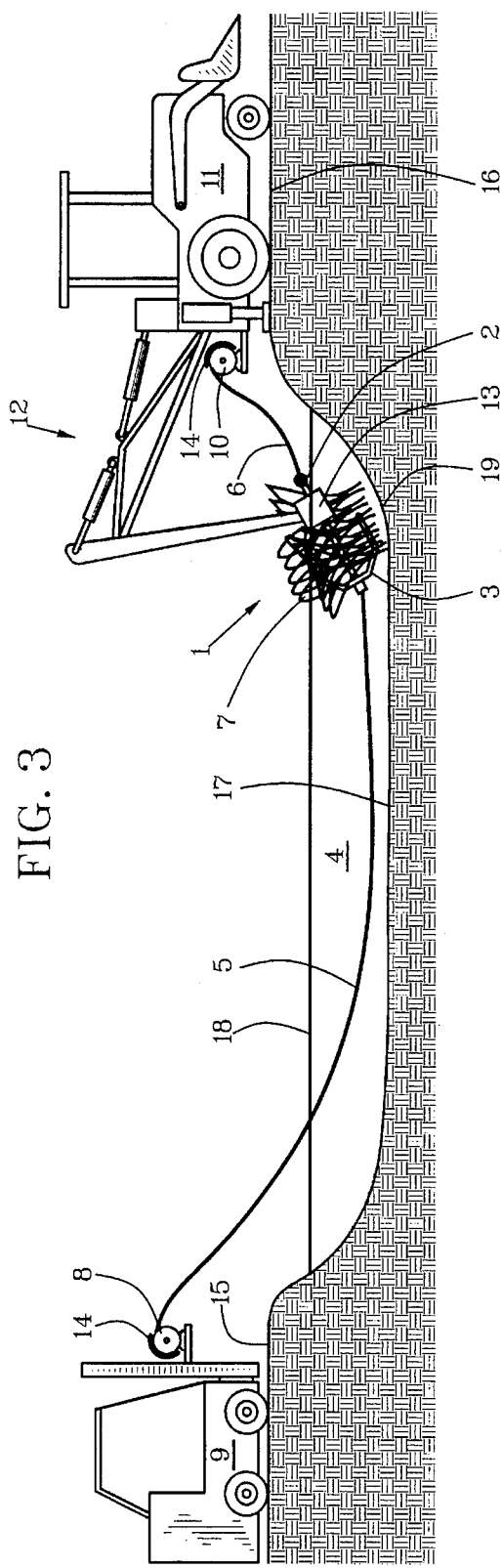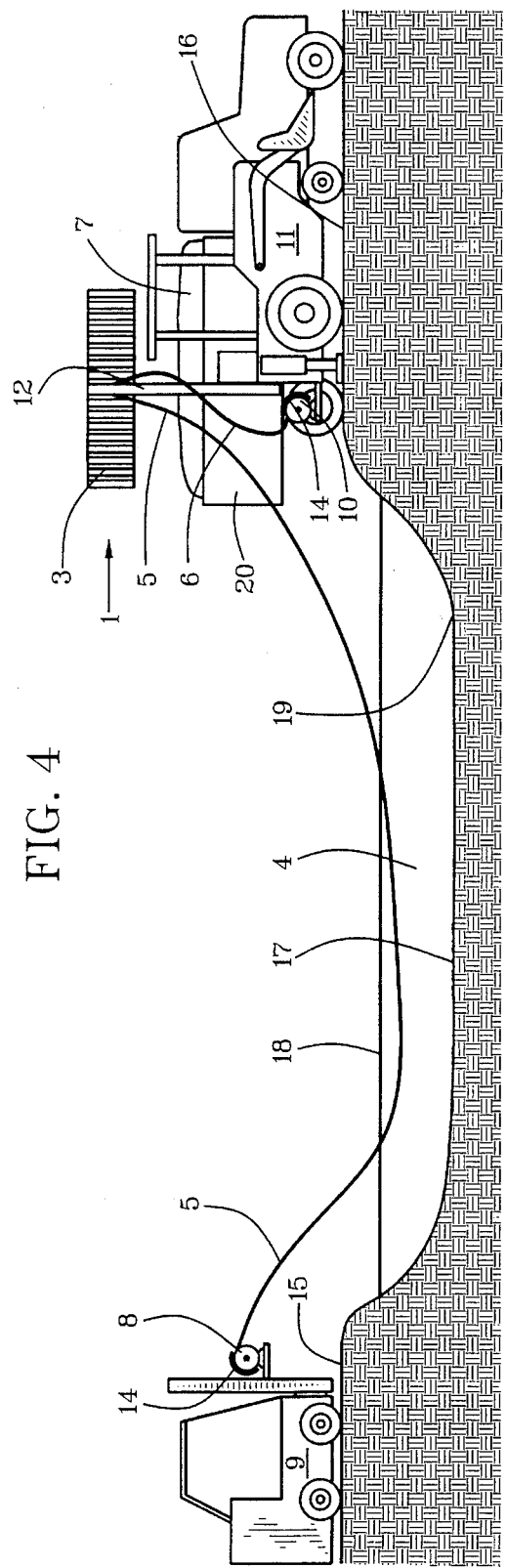

WATER BODY CLEANING APPARATUS AND METHOD

BACKGROUND OF THE INVENTION

This invention relates to removal of aquatic plants and weeds from lakes and other bodies of water with a lake rake on a drag line operated between two vehicles that are earth anchored.

This is an improvement over an apparatus and method for which U.S. Pat. No. 5,074,105 was granted to the same inventor on Dec. 24, 1991. The 1991 patent is highly suitable for many lake-clearing conditions. It is highly mobile and very suitable for many use: conditions where a rake end of a drag line is not accessible to a land vehicle or water vehicle that can be earth-anchored. However, it has been found from experience that many other lake-cleaning and channel-clearing conditions require a different apparatus and method in which opposite ends of a winch-operated drag line are both mounted to earth-anchored vehicles.

In these conditions, use of a boat to transport a distal end of a drag line to operate a lake rake is inadequate for a variety of reasons. Earth-anchoring of a vehicle operating the distal end of the drag line allows more accurate positioning of a take rake without hinderance by the aquatic weeds to be removed. The lake rake can be larger and heavier. Larger and heavier loads can be handled. Less time is consumed in moving a distal rake end of a drag line by using a winch on an earth-mounted vehicle than by propulsion of a boat to carry the distal rake end of the drag line. Less time is consumed for repositioning the lake rake directly with a winch than for repositioning the lake rake back onto a rake float and then propelling the rake float to reposition the lake rake. Regardless of faster mobility and setup of the 1991 device for many use conditions, the present apparatus and method are faster and more efficient for a variety of other use conditions.

In other prior art, U.S. Pat. No. 2,050,133, issued to Smith on Aug. 4, 1936, described a different type of drag-line lake tool with a different means for operating it between vehicles at opposite sides of a body of water. In the Smith device, a clam-like tool was hung from a trolley on a cable suspended between the vehicles on opposite shores of the body of water. The clam-like tool was then pulled back and forth between the two vehicles with a separate set of cables and winches.

SUMMARY OF THE INVENTION

Objectives of this invention are to provide a water-body-cleaning apparatus and method which:

Utilizes an in-line positioning and drag cable suspended between two earth-anchored vehicles to operate a lake rake or other aquatic tool;

Can reposition the lake rake or other aquatic tool rapidly and accurately for being winch-towed to a disposition shore of a body of water;

Can transfer harvested or rake-uprooted aquatic plants from the lake rake or other tool to a stationary or mobile site quickly and efficiently; and Can be mounted onto standard equipment such as backhoes, industrial loaders and agricultural tractors.

This invention accomplishes the above and other objectives with a lake rake or other aquatic tool that is drag-line operated in a body of water between a first earth-anchored vehicle with a motorized winch at a distal position and a second earth-anchored vehicle with a motorized winch and a loading means at a proximal shore of the body of water. The lake rake or other aquatic tool is pulled with a positioning cable by the winch on the first earth-anchored vehicle against selective braking resistance of a drag cable operated by the winch on the second earth-anchored vehicle to position the lake rake or other aquatic tool in a raised position relative to the body of water at a desired position proximate the first earth-anchored vehicle. There the lake rake or other aquatic tool is dropped to a bottom of the body of water by release of tension between the two winches. The lake rake or other aquatic tool is then winched to the proximal shore of the body of water and aquatic plants gathered thereby are removed to a desired site by the second earth-anchored vehicle.

BRIEF DESCRIPTION OF THE DRAWINGS

This invention is described by appended claims in relation to description of a preferred embodiment with reference to the following drawings which are described briefly as follows:

FIG. 3 is a side view with the lake rake being grasped by the load-removal means for load removal;

FIG. 4 is a side view with the lake rake being unloaded onto a truck with the load-removal means;

DESCRIPTION OF PREFERRED EMBODIMENT

Figure 1:
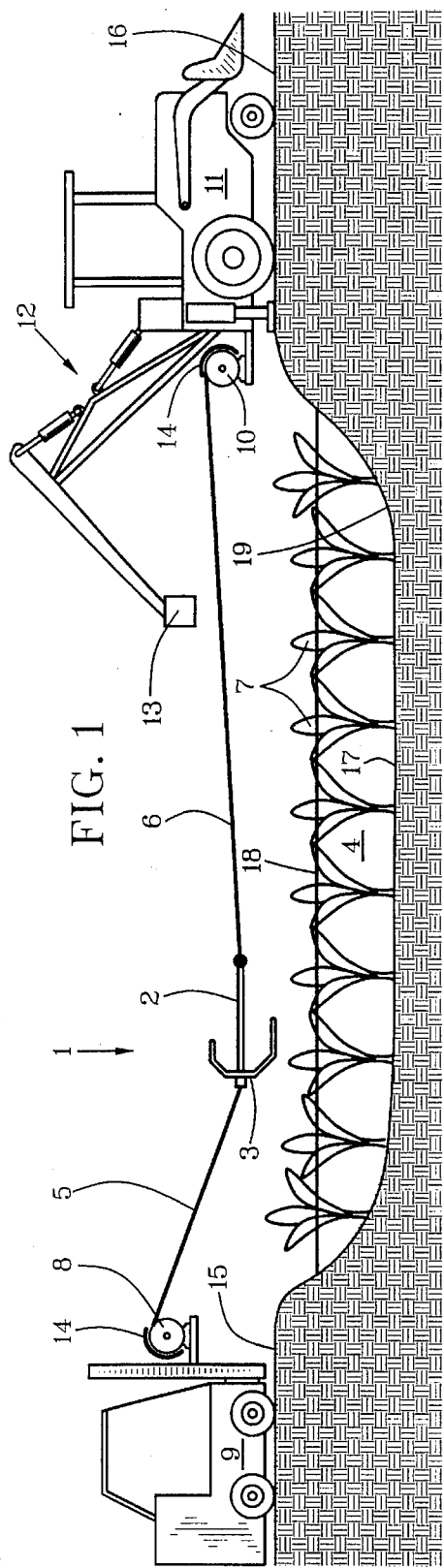
FIG. 1 is a side view with a lake rake being transported towards an opposite shore from a load-removal means.

Reference is made first to FIG. 1. An aquatic tool such as a lake rake 1 having a tongue 2 on a proximal end and tines 3 on a distal end as described in U.S. Pat. No. 5,074,105, is positioned in a body of water 4 with a positioning line 5 and dragged with a drag line 6 for removing aquatic plants 7 from the body of water 4. The positioning line 5 is wound onto a first winch 8 that is positioned on a first earth-anchored vehicle 9. The drag line 6 is wound onto a second winch 10 that is positioned on a second earth-anchored vehicle 11 which has a load-removal means such as a backhoe mechanism 12 with a rake-grasping means 13. The first winch 8 and the second winch 10 are both motorized for selective rotation and have brake means 14 for selective resistance to rotation of each respectively.

Although a variety of agriculture, industrial and construction implements can be employed as earth-mounted vehicles, the first earth-anchored vehicle 9 is preferably a land vehicle such as a lift fork having a typically heavy aft end and the second earth-anchored vehicle 11 is preferably a typical backhoe having vertically lifting and horizontally swiveling capability. For this embodiment, the first earth-anchored vehicle is positioned on a distal position 15 relative to the body of water 4 and the second earth-anchored vehicle 11 is positioned at a proximal position 16 on a shore of the body of water 4. The aquatic plants 7 grow on a bottom 17 of the body of water 4 or in the body of water 4.

Depicted progressively in FIGS. 1–4, aquatic plants 7 growing in the body of water 4 are removed by rotating the first winch 8 in a rotational direction and manner that winds the positioning line 5 onto the first winch 8 selectively. In this manner, the lake rake 1 is winched a desired distance in a direction towards the first earth-anchored vehicle 9 and unwinds the drag line 6 from the second winch 10 while the second winch 10 its being braked with brake means 14 selectively to cause desired tightness of the positioning line 5 and the drag line 6 in order to raise the lake rake 1 to a desired height relative to a surface 18 of the body of water 4 while the lake rake 1 is being positioned at a desired proximity to the first earth-anchored vehicle 9 intermediate the first earth-anchored vehicle 9 and the second earth-anchored vehicle 11.

Figure 2:
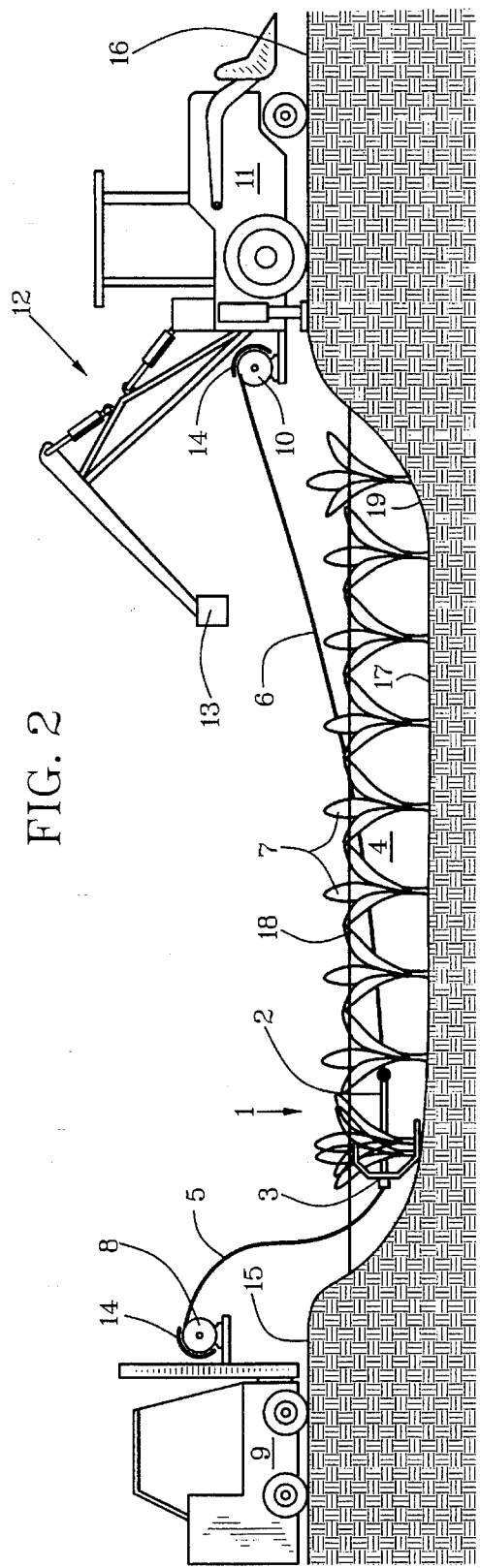
FIG. 2 is a side view with the lake rake being lowered into water and dragged against aquatic plants.

As shown in FIG. 2, the take rake 1 is then dropped to the bottom 17 of the body of water 4 by discontinuing winding rotation of the first winch 8 and allowing either or both of the first winch 8 and the second winch 10 to rotate freely.

Then, as shown in FIG. 3, the second winch 10 is rotated in a direction and in a manner that winds the drag line 6 onto the second winch 10. This winches the lake rake 1 in a raking action to rake aquatic plants 7 to a load-removal position 19 proximate the proximal position 16 on the shore of the body of water 4. There, the rake-grasping means 13 is attached to the tongue 2 on the proximal end of the lake rake 1.

Finally, as shown in FIG. 4, the lake rake 1 is raised vertically, rotated horizontally and positioned radially above a truck 20 or other load-removal destination, and then dumped by swiveling the tongue 2 to desired verticality with the tines 3 in a raised position.

Figure 5:
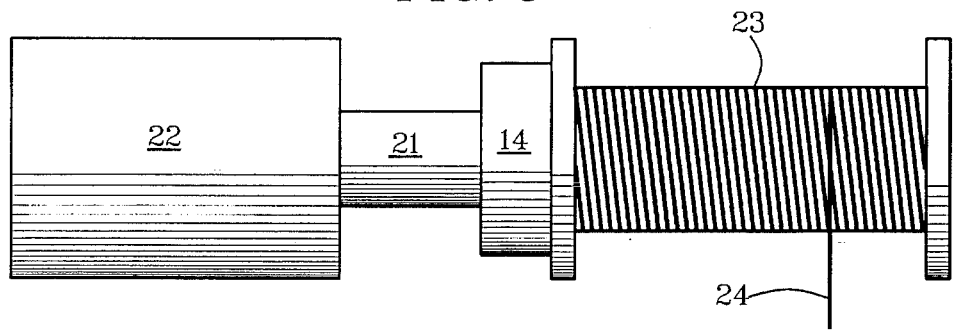
FIG. 5 is a sectional side view of a motorized winch with a brake means.

Referring to FIGS. 1 and 5, a first winch 8 or a second winch 10 have a brake means 14, a transmission means 21 and a motorization means 22 that can be variously positioned in relation to a reel 23 onto which line 24 is reeled in winching action in accordance with standard practices.

Figure 6:
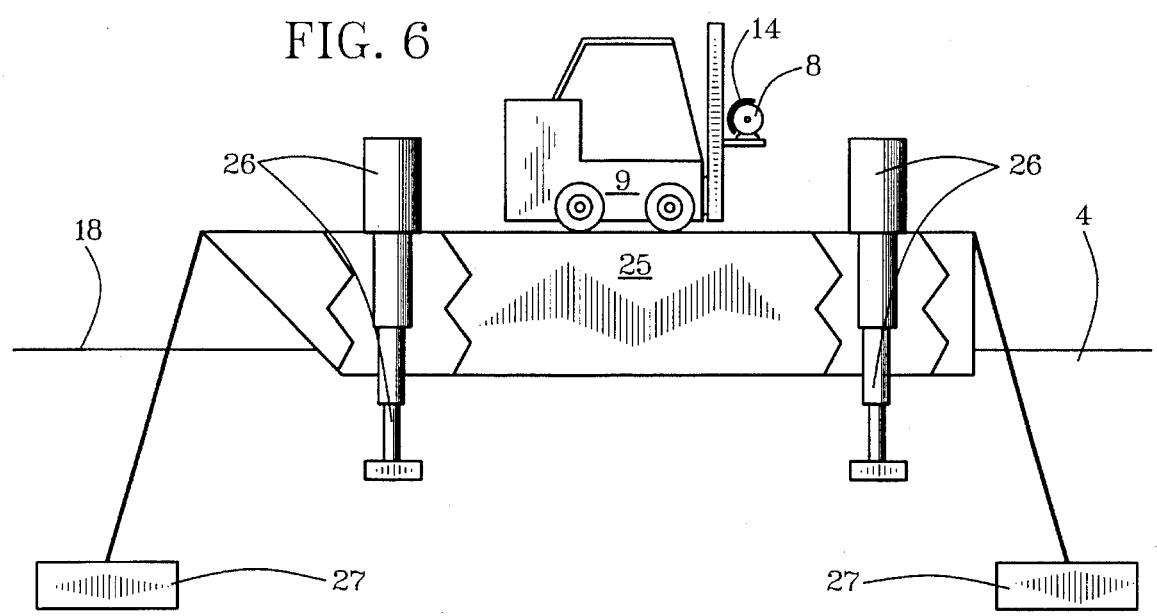
FIG. 6 is a partial cutaway side view of an embodiment of a first earth-anchored vehicle that is earth-anchored by means of being positioned on a marine vehicle that is earth-anchored to a bottom of a body of water with either hydraulic legs or line anchors.

Referring to FIGS. 1 and 6, the first earth-anchored vehicle 9 can be earth-anchored by means of being positioned on a marine vehicle 25 that is anchored to a bottom 17 of a body of water 4 with either or both hydraulic jacks 26 or line anchors 27. This embodiment is especially useful in cleaning large lakes or other large water bodies wherein the distance from proximal to distal shores is too great to run a drag line between said shores.

Figure 7:
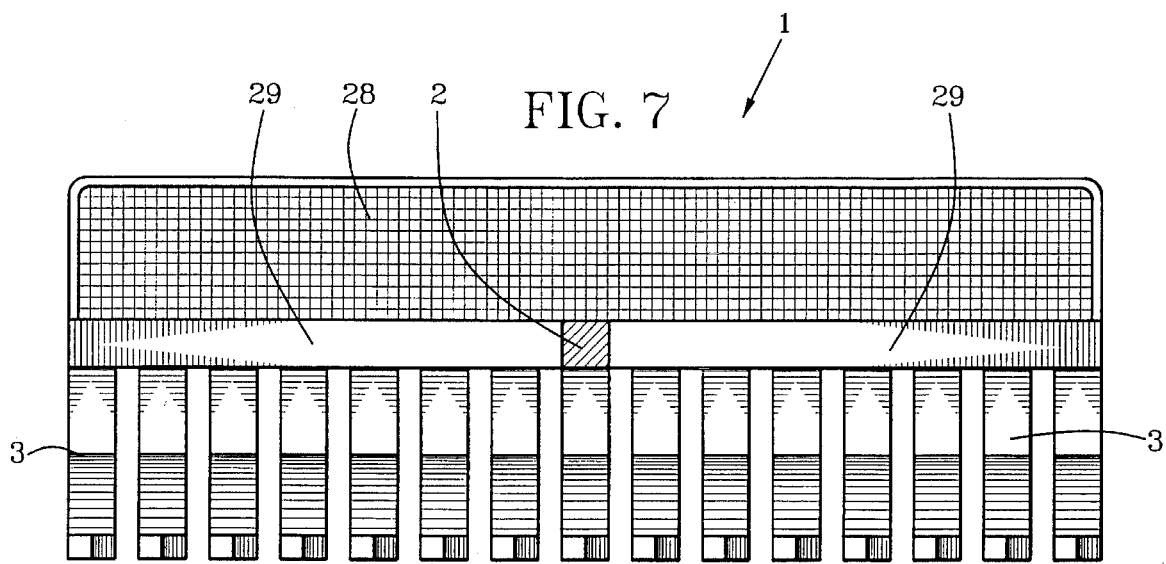
FIG. 7 is a front view of an optional lake rake with a screen for a top portion to prevent entanglement of aquatic plants.

Referring to FIGS. 1 and 7, a lake rake 1 can have a screen 28 positioned above the tines 3 to prevent the aquatic plants from wrapping around a tine rod 29 which is extended horizontally from the tongue 2 and from which the tines 3 are extended vertically downward. The screen 28 can be any of a variety of types of screening devices with orifices or passages through it which are small enough to prevent entry of vines, roots and leaves of the aquatic growth 7. Small orifices in a screen plate is one alternative to the mesh type of screen illustrated in FIG. 7. Preferably the screen 28 is supported with rods similar to tines which are extended vertically above the tine rod 29. Alternatively also, the screen 28 can be positioned in front of the tines 3 above the tongue or used in lieu of tines 3 above the tongue 2.

Reference to U.S. Pat. No. 5,074,105 is recommended for additional description in relation to this invention.

A new and useful water-body-cleaning apparatus and method having been described, all such modifications, adaptations, substitutions of equivalents, combinations of parts, applications and forms thereof as described by the following claims are included in this invention.

I claim:

1. A water-body-cleaning apparatus comprising:

a first earth-anchored vehicle at a desired distal position relative to a body of water;

a second earth-anchored vehicle at a desired proximal position on a shore of the body of water;

a first winch with selective brake resistance and motorized rotation on the first earth-anchored vehicle.;

a second winch with selective brake resistance and motorized rotation on the second earth-anchored vehicle;

an aquatic tool;

a positioning line attached to a distal end of the aquatic tool and wound onto the first winch;

the positioning line being extended intermediate the distal end of the aquatic tool and the first winch;

a drag line attached to a proximal end of the aquatic tool and wound onto the second winch;

the drag line being extended intermediate the proximal end of the aquatic tool and wound onto the second winch; and a load-removal means on the second earth-anchored vehicle.

2. A water-body-cleaning apparatus according to claim 1 wherein:

the first earth-anchored vehicle is a land vehicle; and the distal position is an opposite side of the body of water from the proximal position on the shore of the body of water.

3. A water-body-cleaning apparatus according to claim 1 wherein:

the first earth-anchored vehicle is a marine vehicle anchored to earth beneath a bottom of the body of water and containing implementation to which the first winch is attached; and the distal position is a desired position on the body of water at desired distance from the proximal position on the shore of the body of water.

4. A water-body-cleaning apparatus according to claim 1 wherein:

the second earth-mounted vehicle is a motorized backhoe; and the load-removal means has vertically lifting and horizontally swiveling means for transferring material from the aquatic tool to a desired disposition site.

5. A water-body-cleaning apparatus according to claim 1 wherein:

the aquatic tool is a lake rake.

6. A water-body-cleaning apparatus according to claim 5 and further comprising:

a screen positioned on a top portion of the lake rake to prevent entanglement of aquatic material onto a lateral portion of the lake rake for ease of dumping.

7. A water-body-cleaning apparatus according to claim 1 wherein:

the first earth-anchored vehicle is a land vehicle;

the distal position is an opposite side of the body of water from the proximal position on the shore of the body of water;

the second earth-mounted vehicle is a motorized backhoe; and the load-removal means has vertically lifting and horizontally swiveling means for transferring material from the aquatic tool to a desired disposition site.

8. A water-body-cleaning apparatus according to claim 1 wherein:

the first earth-anchored vehicle is a marine vehicle anchored to earth beneath a bottom of the body of water and containing implementation to which the first winch is attached;

the second earth-mounted vehicle is a motorized backhoe; and the load-removal means has vertically lifting and horizontally swiveling means for transferring material from the aquatic tool to a desired disposition site.

9. A method for using a water-body-cleaning apparatus having:

a first earth-anchored vehicle at a desired distal position relative to a body of water;

a second earth-anchored vehicle at a desired proximal position on a shore of the body of water;

a first winch with selective brake resistance and motorized rotation on the first earth-anchored vehicle;

a second winch with selective brake resistance and motorized rotation on the second earth-anchored vehicle;

an aquatic tool;

a positioning line attached to a distal end of the aquatic tool and wound onto the first winch;

the positioning line being extended intermediate the distal end of the aquatic tool and the first winch;

a drag line attached to a proximal end of the aquatic tool and wound onto the second winch;

the drag line being extended intermediate the proximal end of the aquatic tool and wound onto the second winch;

a load-removal means on the second earth-anchored vehicle;

the aquatic tool is a lake rake;

the first earth-anchored vehicle is a land vehicle; and the distal position is an opposite side of the body of water from the proximal position on the shore of the body of water;

the method comprising the following steps:

(A) rotating the first winch in a manner that winds the positioning line onto the first winch selectively, that winches the lake rake a desired distance in a direction towards the first earth-anchored vehicle, and that unwinds the drag line from the second winch while the second winch is being braked selectively to cause desired tightness of the positioning line and the drag line in order to raise the lake rake a desired height relative to height of a surface of the body of water while the lake rake is being positioned at a desired proximity to the first earth-anchored vehicle intermediate the first earth-anchored vehicle and the second earth-anchored vehicle;

(B) dropping the lake rake to a bottom surface of the body of water by discontinuing winding rotation of at least one winch;

(C) rotating the second winch in a manner that winds the drag line onto the second winch and winches the lake rake in a raking action to rake aquatic plants to a load-removal position proximate the shore of the body of water where the second earth-anchored vehicle is positioned; and (D) operating the load-removal means to remove the aquatic plants.

10. A method according to claim 9 and further comprising: repeating steps A–D as necessary to clean aquatic plants as desired from a section of the body of water intermediate the first earth-anchored vehicle and the second earth-anchored vehicle.

11. A method according to claim 10 and further comprising:

repositioning the first earth-anchored vehicle and the second earth-anchored vehicle a desired distance in a common general direction to position the lake rake to be in contact with a desired different section of the body of water; and repeating steps A–D as necessary to clean aquatic plants as desired from the desired different section of the body of water intermediate the first earth-anchored vehicle and the second earth-anchored vehicle.

12. A method for using a water-body-cleaning apparatus having:

a first earth-anchored vehicle at a desired distal position relative to a body of water;

a second earth-anchored vehicle at a desired proximal position on a shore of the body of water;

a first winch with selective brake resistance and motorized rotation on the first earth-anchored vehicle;

a second winch with selective brake resistance and motorized rotation on the second earth-anchored vehicle;

an aquatic tool;

a positioning line attached to a distal end of the aquatic tool and wound onto the first winch;

the positioning line being extended intermediate the distal end of the aquatic tool and the first winch;

a drag line attached to a proximal end of the aquatic tool and wound onto the second winch;

the drag line being extended intermediate the proximal end of the aquatic tool and wound onto the second winch;

a load-removal means on the second earth-anchored vehicle;

the aquatic tool is a lake rake;

the first earth-anchored vehicle is a marine vehicle anchored to earth beneath a bottom of the body of water and containing implementation to which the first winch is attached; and the distal position is a desired position on the body of water at a desired distance from the proximal position on the shore of the body of water;

the method comprising the following steps:

(A) rotating the first winch in a manner that winds the positioning line onto the first winch selectively, that winches the lake rake a desired distance in a direction towards the first earth-anchored vehicle, and that unwinds the drag line from the second winch while the second winch is being braked selectively to cause desired tightness of the positioning line and the drag line in order to raise the lake rake a desired height relative to height of a surface of the body of water while the lake rake is being positioned at a desired proximity to the first earth-anchored vehicle intermediate the first earth-anchored vehicle and the second earth-anchored vehicle;

(B) dropping the lake rake to a bottom surface of the body of water by discontinuing winding rotation of at least one winch;

(C) rotating the second winch in a manner that winds the drag line onto the second winch and winches the lake rake in a raking action to rake aquatic plants to a load-removal position proximate the shore of the body of water where the second earth-anchored vehicle is positioned; and (D) operating the load-removal means to remove the aquatic plants.

13. A method according to claim 12 and further comprising:

repeating steps A–D as necessary to clean aquatic plants as desired from a section of the body of water intermediate the first earth-anchored vehicle and the second earth-anchored vehicle.

14. A method according to claim 13 and further comprising:

repositioning the first earth-anchored vehicle and the second earth-anchored vehicle a desired distance in a common general direction to position the lake rake to be in contact with a desired different section of the body of water; and repeating steps A–D as necessary to clean aquatic plants as desired from the desired different section of the body of water intermediate the first earth-anchored vehicle and the second earth-anchored vehicle.

* * * * *